March 22, 1932.  F. PORSCHE  1,850,769

DYNAMO ELECTRIC DRIVING SET FOR VEHICLES

Filed July 10, 1928   5 Sheets-Sheet 1

Inventor
FERDINAND PORSCHE
By
Attorneys

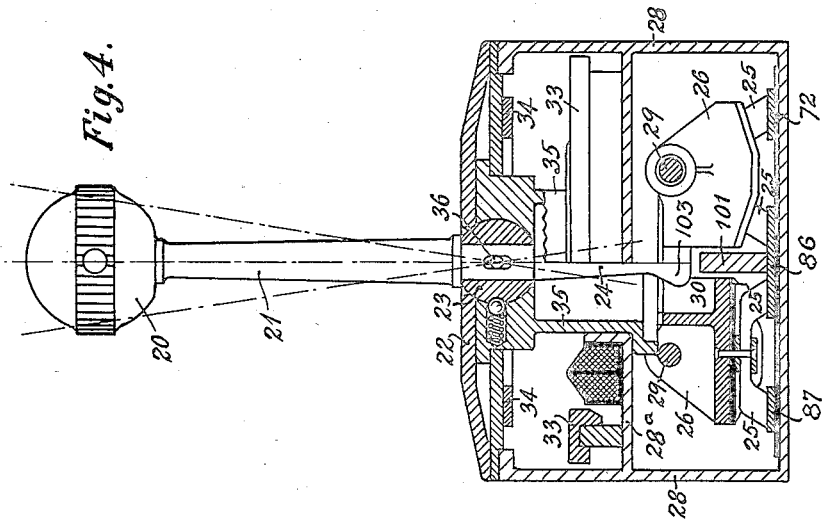
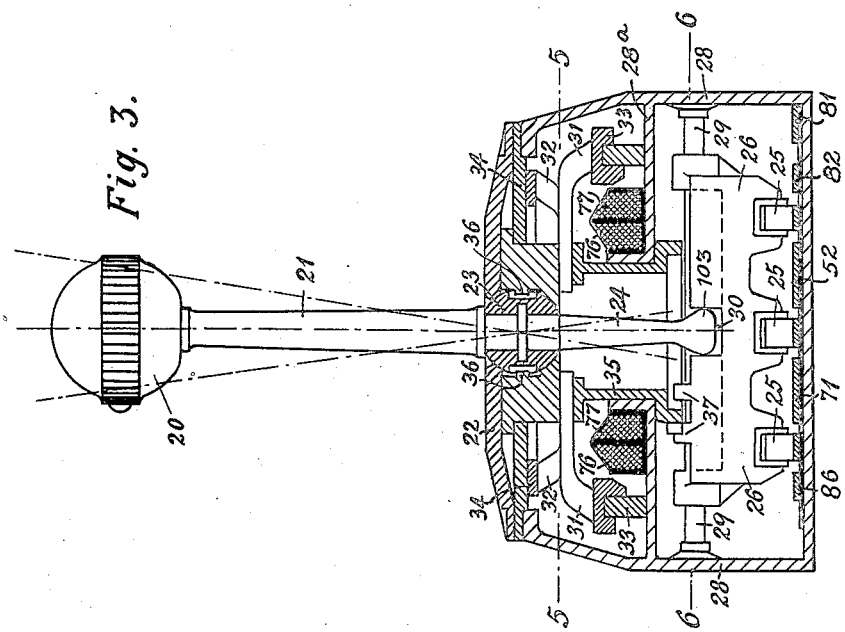

March 22, 1932.  F. PORSCHE  1,850,769
DYNAMO ELECTRIC DRIVING SET FOR VEHICLES
Filed July 10, 1928   5 Sheets-Sheet 3

Inventor
FERDINAND PORSCHE
By
Attorneys

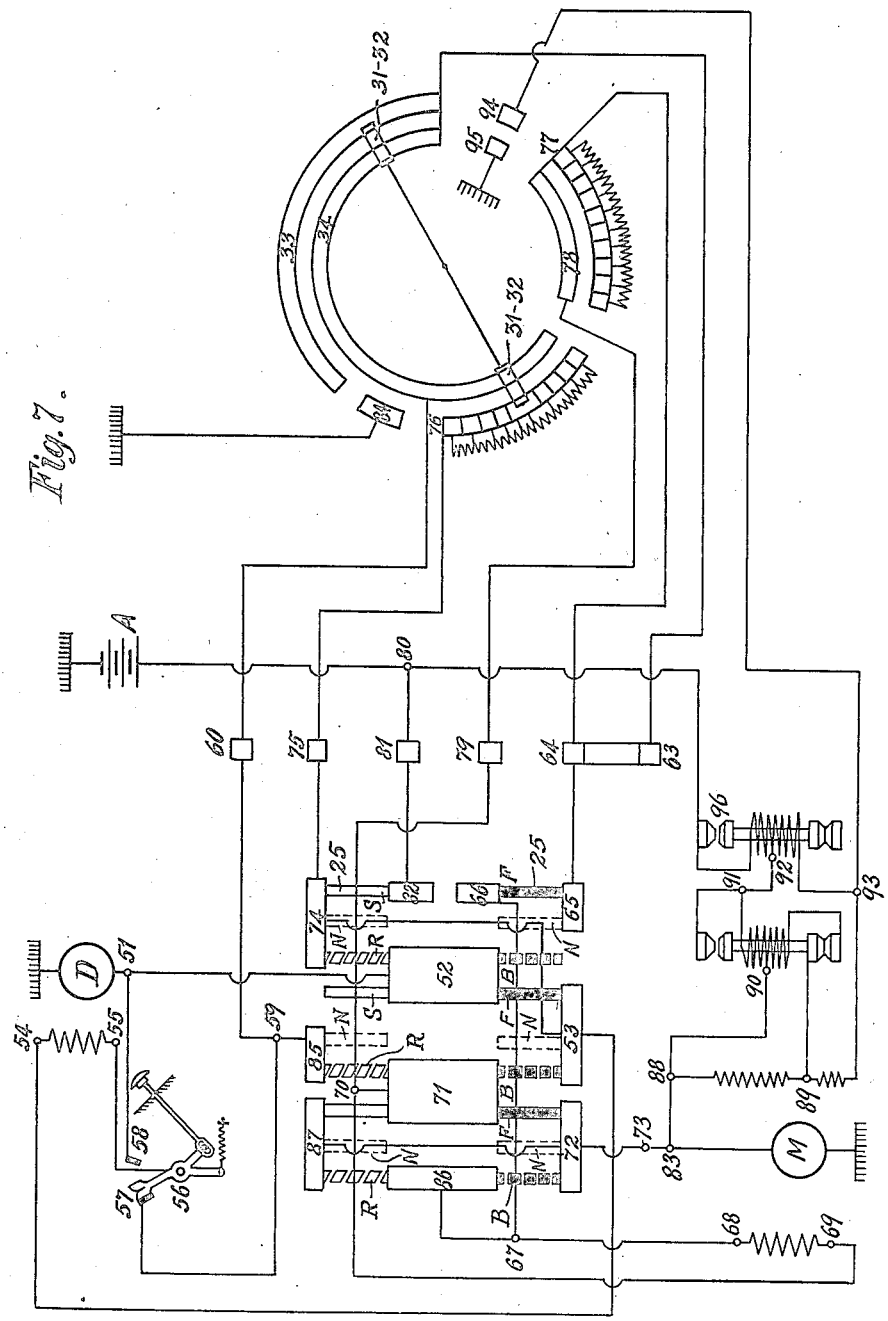

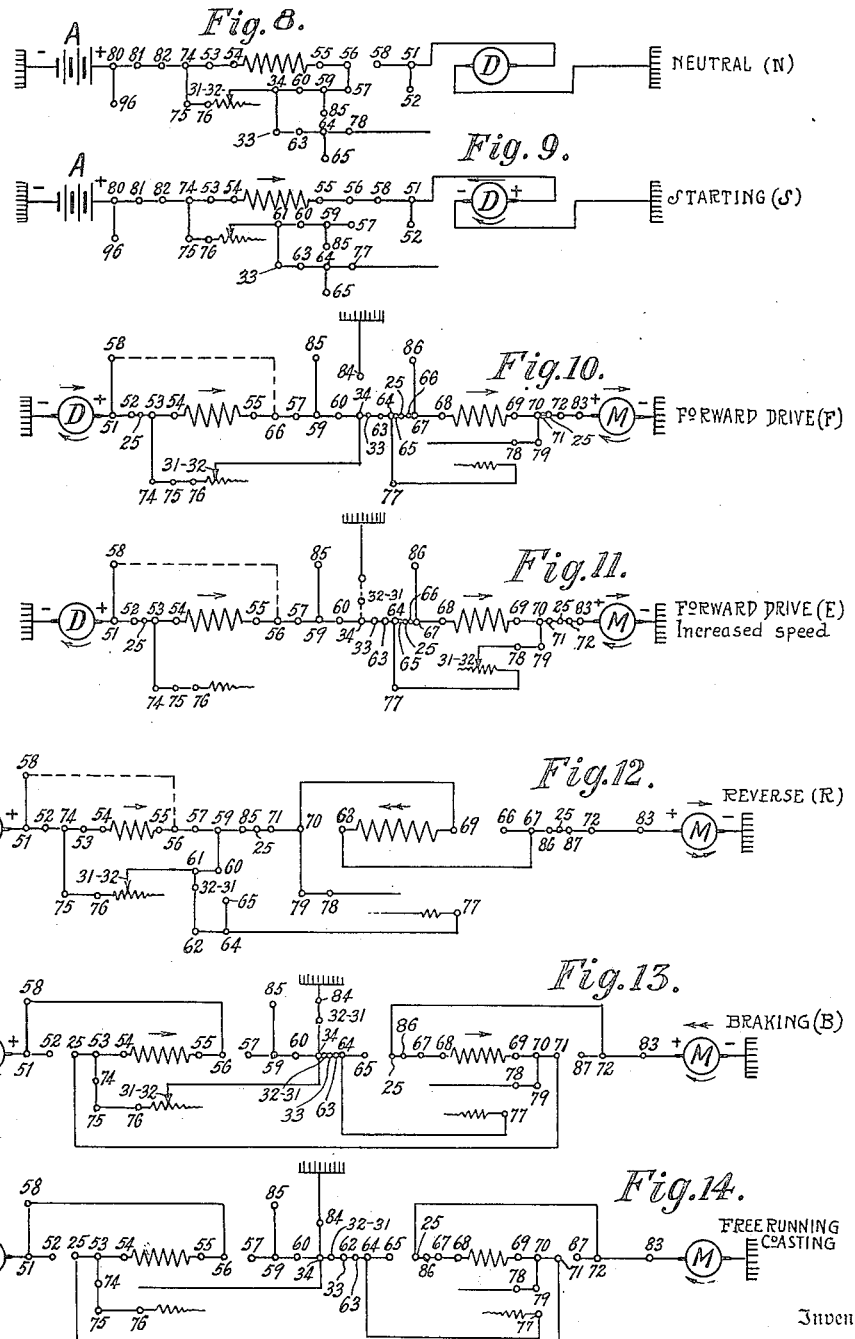

Patented Mar. 22, 1932

1,850,769

UNITED STATES PATENT OFFICE

FERDINAND PORSCHE, OF STEYR, AUSTRIA, ASSIGNOR TO DAIMLER-BENZ AKTIEN-GESELLSCHAFT, OF STUTTGART-UNTERTÜRKHEIM, GERMANY, A COMPANY OF GERMANY

DYNAMO-ELECTRIC DRIVING SET FOR VEHICLES

Application filed July 10, 1928, Serial No. 291,520, and in Austria July 29, 1922.

This invention relates to dynamo-electric driving sets of the type employed for driving automotive vehicles and particularly to the construction of switches for controlling the functions of such sets.

The principal object of the invention is to provide a new and improved construction for a controlling switch for an automotive vehicle's dynamo-electric driving set that will enable the principal functions of the set to be attained by the operation of a single main controlling lever. Another object is to so construct the switch that its manipulation will be similar to the manipulation of the lever of the usual selective, sliding gear transmission employed in automobiles. A further object is to provide a switch embodying a plurality of resistance elements which perform the function of a rheostat and in which the main switching connections are made by movement of the switch actuating lever by oscillation thereof upon a pivotal support, while the rheostat function is accomplished by rotation of the actuating lever upon its pivotal axis.

Another object is to construct the switch so that it may be constructed as an unitary assembly with a dynamo-electric set of the type shown in my co-pending application for Letters Patent of the United States Serial No. 652,721, filed July 20, 1923, which has since issued as Patent No. 1,758,533, May 13, 1930, of which the present application is in part a continuation.

The above and other objects of the invention will appear more fully from the following more detailed description and by reference to the accompanying drawings forming a part hereof. In order that the invention may be fully understood it has been illustrated and described in conjunction with a dynamo-electric set of the type claimed in the aforementioned application Serial No. 652,721.

In the drawings:

Fig. 3 is a central vertical section through the hand controlled switch;

Fig. 4 is a view similar to Fig. 3, taken on a section line at right angles to that of Fig. 3;

Figure 6:
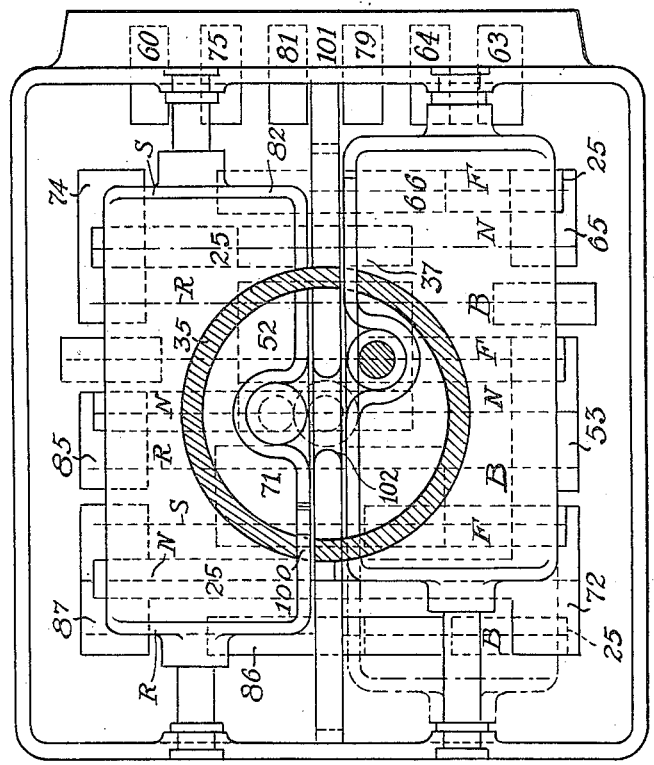
Figure 5:
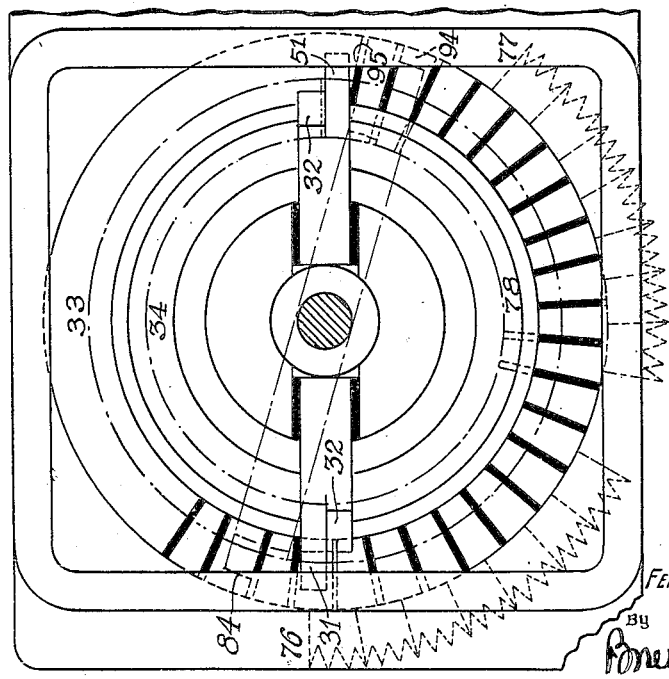

Figs. 5 and 6 are sections on the line 5—5 and 6—6 respectively of Fig. 3;

Fig. 7 is a wiring diagram of the electrical connections;

Fig. 8 is an across-the-line diagram corresponding to Fig. 7; and

Figs. 9, 10, 11, 12, 13 and 14 are diagrams similar to Fig. 8 and showing the circuits for the various set positions of the switches which correspond respectively to "starting," "forward drive," "forward," increased speed, "reverse", "braking", and "free running" or "coasting."

Figure 1:
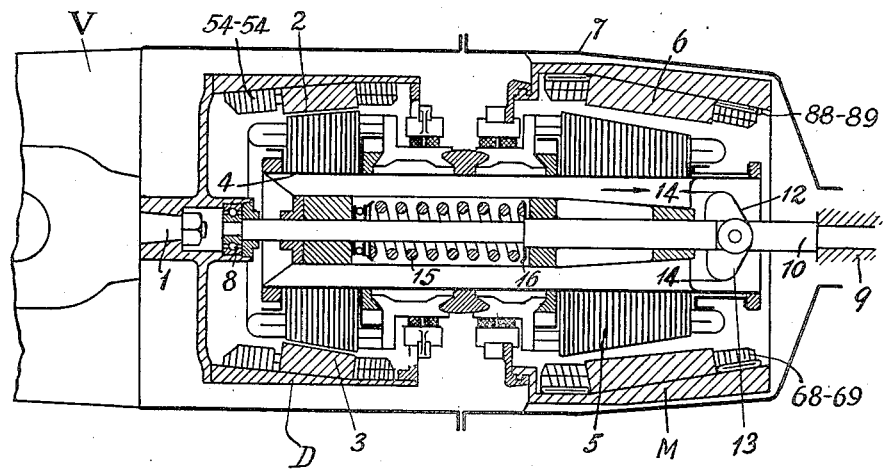
Fig. 1 is a central longitudinal section through the generator-motor set.

As shown in Fig. 1, the generator-motor set is connected to the crank shaft end 1 of an internal combustion engine diagrammatically indicated by the reference character V, the crank shaft 1 being securely connected to the rotating field magnet 2 of a continuous current series wound generator D. The armature 3 of said generator is keyed to a hollow shaft 4, on the other end of which shaft is secured in a like manner the armature 5 of a continuous current series wound motor M, the field 6 of which is rigidly and non-rotatably secured to the housing 7. The hollow shaft 4 is mounted upon a solid driving shaft 10 which is rotatably carried in the bearings 8 and 9 and is secured against longitudinal movement. Hollow shaft 4 is connected, by means presently to be described, to the solid shaft 10 in such a way that the hollow shaft will have, to a limited extent, both rotatable and longitudinal movement relatively to the solid shaft.

Figure 2:
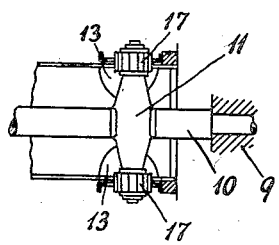
Fig. 2 is a sectional detail showing the operative connection between a pair of shafts upon which are mounted the rotary members of the set.

This means comprises a member 11 which will be termed a hammer head and which is securely associated with the driving shaft 10. This member, as shown most clearly in Fig. 2, consists of a pair of arms which project laterally from opposite sides of the shaft 10, and which arms carry at their extremities roller or ball bearings 17. These bearings 17 engage within a pair of oppositely situated slots or recesses 13 formed in the hollow shaft 4. As shown in Fig. 1, each of the recesses has one side thereof shaped to provide a curved cam surface 12 of predetermined definite curvature.

A spiral compression spring 15 is coiled about the shaft 10; one end of the spring 15, as shown in Fig. 1, abuts against the shoulder 16 on the driving shaft 10, and the other end of said spring abuts a collar secured to the hollow shaft 4 so that the spring 15 tends to move the shaft 4 in a direction opposite to that indicated by the arrow in Fig. 1, and thus to hold the curved cam surface 12 of the hollow shaft against the periphery of the bearings 17. When the parts are at rest, the spring 15 tends to hold the roller 17 normally in the position shown in Fig. 1 of the drawings, in which position it will be noted the mid-bearings are located substantially at the mid-point of the curve 12. If now the hollow shaft 4 is set in rotation by the drive of the motor M, the hammer head 11 and bearing 17 will move along the curve 12 until the tangential components, with respect to the shaft, of the force of compression of the spiral spring 15 (which in one direction of rotation is increased, and in the other is diminished, by the solenoid action of the field magnets of the electrical machines,) are in equilibrium with the circumferential force of the driving shaft 10. As will be clearly seen from Fig. 1 of the drawings, the spring 15 serves to exert a pressure which holds the periphery of the curved cam surface 12 resiliently against the periphery of the bearings 17. The curvature of the cam 12 is such that when the bearings move along the curve in either direction from the position shown in Fig. 1, a movement of the hollow shaft 4 longitudinally of the shaft 10 will occur. As will be seen from Fig. 1, the armatures 3 and 5 are of conical construction and have their basal surfaces turned towards each other; the field magnets 2 and 6 of said armatures are also of conical construction so that the air gap, and therewith the magnetic resistance of the one machine, is diminished by the longitudinal movement of the hollow shaft 4, and that of the second machine is increased. The curvature of the curve 12 is preferably made asymmetric with relation to the longitudinal axis of the set in such a manner that that half of the curve which is concerned with the one direction of rotation (forward drive) is more strongly curved than the other half for the other direction of rotation (backward drive), because the magnetic force of the rotating machines on the movable armature cores is added to the force of the spring 15 in the one direction of rotation and subtracted therefrom in the other direction. The necessary condition of equilibrium of the circumferential forces of the two shafts 4 and 10 is therefore obtained in accordance with the formula of the cam 12, which has a definite predetermined curvature. As will be readily understood from the foregoing description, the hammer head 11 with its cooperating parts, namely the bearings 17 and cam surface 12, in addition to serving to regulate automatically the turning moment, also forms what may be termed a clutch which is free from shocks and which prevents the road shocks to which the vehicle wheels are subjected from being transmitted to the set.

For controlling the various functions of the set, two switches are provided which are preferably associated with the set so as to form therewith an unitary assembly. One of these switches is constructed to be operated as a hand switch and the other as a foot switch, the manner of operation of the switches or their controlling levers being similar to the operation of the gear shifting hand lever and clutch foot pedal usually provided on automobiles. The hand or driving switch, as clearly shown in Figs. 3 to 6 inclusive, is actuated by a hand lever, which is moved in a manner similar to that of the usual gear shift lever for automobile selective, sliding gear transmissions, and said switch permits the individual switchings (starting, forward drive, backward drive, neutral position and braking) to be effected by moving the hand lever, as will presently be described in connection with the description of the switching diagrams.

The hand lever 21, as clearly shown in Figs. 3 and 4, is provided at its upper end with a knob 20 and is pivotally supported upon a pin 36 in a bearing 23, the bearing 23 being of ball formation and rotatably supported in a similarly shaped ball socket formed within the cover 22 of the switch box 28 and a hollow cylinder 35. The mounting of the hand lever 21 is such that it may be swung in one plane upon the pin 36 as a pivot and in a plane at right angles thereto by rotation of the ball-shaped bearing 23 within its socket. The handle 21 extends through the bearing 23 to form an arm 24, the lower end of which terminates in a ball-shaped protuberance 103. Suitably secured within the switch box 28 to the bottom thereof are a number of electrical contacts 87, 85, 74, 86, 71, 52, 82, 66, 72, 53 and 65, suitably insulated from the switch box cover and spaced and insulated from each other. These contacts are arranged in spaced, parallel rows, as indicated in Fig. 6 of the drawings and in Fig. 7 thereof, the contacts 87, 85 and 74 forming one row adjacent to one side of the switch box, the contacts 72, 53 and 65 forming a second row adjacent to the opposite side of the switch box, and the contacts 86, 71, 52, 82 and 66 being arranged centrally of the switch box between the above-mentioned two rows. As shown in Figs. 3, 4 and 6, a pair of movable brush holders 26 are mounted within the switch box 28, one upon each side of the longitudinal center line of the box, each of said brush holders being slidably mounted upon a bolt 29 which extends through the switch box and is secured in the end walls thereof. Each brush holder carries three brushes 25 spaced from each other longitudinally of the bolt 29 and brush holder 26, and said brushes, as clearly shown in Fig. 4, are formed somewhat in the shape of an inverted U and are adapted to span the space between the central row of contacts above referred to and the side row of contacts with which each set of brushes is intended to cooperate. Each of the brush holders 26 is provided midway between its ends with a recess 30 or any equivalent structure, in which the ball end 103 of the arm 24 is adapted to be interlocked so that by manipulating the hand lever in the manner hereinafter to be described, either brush holder 26 may be slid along its bolt 29 to bring its set of brushes 25 into different set positions to effect the various individual switching positions of the set. When the lever 21 is in the vertical, or neutral, position, shown in Figs. 3 and 4 of the drawings, the lower end 24 of the lever 21 is out of engagement with the brush holders 26; when, however, the lever 21 is inclined either to the right or the left (Fig. 4) to the positions indicated by the dot and dash lines in said figure, the end 103 of the arm 24 is brought into interlocking engagement with the recess 30 of one of said brush holders. After the lever 21 has been so inclined, movement thereof either forwardly or rearwardly (to the right or left of Fig. 3) will cause the brush holder with which the end 103 has been engaged to be slid along the bolts 29 to bring the brushes into their various set positions.

Four different individual switching are accomplished in this manner, which switchings correspond with the four functions of the set, namely, starting, forward driving, reverse, and braking. These four switching positions of the brushes 25 are indicated in Figs. 6 and 7 of the drawings by the reference characters S, F, R and B respectively, while the neutral position is indicated by the reference character N. In order to prevent accidental disengagement of the ball 103 from either brush holder 26 after the brush holder and brushes have been moved to one of the four switching positions, the bottom of the switch box is provided with a web 101 which extends along the longitudinal center of the box, said web having at its center a slot or recess 102 in which the ball 103 is located when the lever 21 is in its neutral position and through which the ball may pass for engagement with the recess 30 of either brush holder. It will be seen that with this construction, the ball 103 will be locked in engagement with a brush holder when the lever 21 is moved either forwardly or backwardly, this movement of the lever obviously bringing the ball out of alignment with the central recess 102 of the web 101 and preventing the disengagement of the ball from either of the recesses 30 of the respective brush holders until the brush holder and brushes are returned to their neutral position. The switch box is provided with a plurality of binding posts 60, 75, 81, 79, 64 and 63 which are connected with the various contacts of the switch box hereinbefore described, and with the other members of the electrical system in the manner indicated in the diagrammatic showing of Fig. 7. In order to regulate the current passing through the electrical system for the individual switchings of the hand lever 21, the switch box 28 is provided with a second set of contacts 33, 34, 94, 95, 77, 78, 76 and 84 with which a set of brushes 31, 32 are adapted to cooperate. The connections of this last-mentioned group of contacts with the binding posts above referred to and the other parts of the electrical system, are clearly indicated in Fig. 7 of the drawings.

In the particular constructional example illustrated, the contacts 33, 94, 77, 76 and 84 are mounted upon a horizontal web or partition 28a of the switch box, and the contacts 34, 95 and 78 are carried by the cover 22 of said switch box. The connections between these contacts are effected by the brushes 31 and 32, carried by radial arms secured in, and suitably insulated from, the hollow cylinder 35. The outer end of each radial arm is bifurcated and bent to form a downwardly extending portion to which is secured the brush 31 which is adapted to wipe across the contacts carried by the web 28a, and an upwardly extending portion to which is secured the brush 32 which is adapted to wipe across the contacts carried by the cover 22. The switching performed by the brushes 31, 32 is effected by rotating the lever 21 about its longitudinal axis, this rotation of the lever being communicated by the pin 36 to the hollow cylinder 35.

The arrangement of contacts 33, 34, 94, 95, 76, 77, 78 and 84, more fully indicated in the wiring diagram (Fig. 7) allows, by means of suitable resistance switching, one resistance to be switched-in in parallel with the field of the generator and the other in parallel with the field of the motor, so that within definite limits, the turning moment of the internal combustion engine necessary, in consequence of the driving conditions present at any time (alteration of fuel, alteration of the atmospheric pressure at different altitudes, reduction of power of the internal combustion engine owing to engine troubles, or other like causes) is always adapted to these conditions. Furthermore, the braking action is influenced and regulated by a similar alteration of resistance, and moreover in the terminal position of rotation the dynamo D is short-circuited and works with but little or no slip as an electric clutch, so that a direct transmission of the mechanical energy to the driving shaft 10 is possible without the intervention of the electro-motor M (direct working) as is more fully described below.

In order to prevent a change from one of the main individual switching positions to another of such positions, except at such times as the above mentioned resistances have been short-circuited, so that the machine will be free from electrical pressure, and to prevent sparking or arcing when such switching changes are made, means are provided for preventing the forward or backward movement of the lever 21 except when the brushes 31, 32 have been moved to their terminal positions. This means consists of a pair of recesses 100 provided in the lower edge of the hollow cylinder 35, one of said recesses being provided for each brush holder. Each brush holder is provided with a pair of stops 37 which, as shown in Figs. 3 and 6, are so constructed and arranged that they will pass through their respective recess 100 only when the handle 21 has been rotated to bring the brushes 31, 32 to their definite short-circuited position, and which, in any other of the rotational positions of the handle 21, will engage with the lower edge of the hollow cylinder 35 and lock their respective brush holders against forward or backward movement.

For the starting and switching-off functions of the set, I provide a switch of the snap type, illustrated somewhat diagrammatically at 56—57—58 in Fig. 7, which switch is preferably firmly connected with the set and is adapted to be actuated by a foot lever. To this switch, the following duties are assigned:

First: In the starting position of the driving switch, to maintain the connection between the battery A and the dynamo or generator D, the latter being switched-in as a starting motor for the purpose of starting the internal combustion engine V, as long as the foot switch is depressed.

Second: To render it possible at any time for the driver intentionally to interrupt, on the one hand the transmission of power from the internal combustion engine to the driving shaft, both in forward and also in backward driving, and on the other hand, the transmission of power from the vehicle to the dynamo-electric set (brake).

The wiring diagram of the installation is shown in Fig. 7, and the manner in which the circuits are completed, through the necessary contacts and branch lines, for the various individual operative switchings are indicated in Figs. 8 to 14 inclusive, the same reference numerals being used throughout to indicate the same parts. In Fig. 7 the numerals 54, 55 indicate the excitation of the generator, and 68, 69 that of the motor. The lines leading upwards and downwards from the contacts 86, 71, 52, 82 and 66 represent the electric connections effected for the various switching positions of the two brush systems 25 of the hand driving switch. The dot and dash lines, adjacent to which the reference character N appears, indicate the positions of the brushes 25 for the neutral position of the hand lever 21; the light full lines S leading to the contacts 87 and 74 indicate the positions of the brushes for starting; the diagonally lined light lines R indicate the reverse or backward driving position; the heavy full lines F leading downwards to the contacts 72, 53 and 65 indicate the position for forward driving, and the heavy broken lines B indicate the position for braking. For the sake of clearness the contacts 33, 34, 84, 76, 77, 78, 94 and 95, which are brought into conducting relation by the rotation of the hand lever 21 about its own axis, have been drawn separately at the right hand side of the figure. The contacts 94 and 95 when placed in communication by such rotation of the hand lever cause, through a quick-acting solenoid switch and circuit 90, 91, 92, 93 and 96, the excitation of an auxiliary winding 88, 89 of the motor M. The binding posts of the switch box 28 are indicated by the numerals 60, 75, 81, 79, 64 and 63.

With the switch in the starting position, the brushes 25, being in the position S, are engaged with the contacts 82, 74, thus causing current from the battery A to flow through the wires which connect the contact 74 and the contact 53 and which connect the latter to the field 54, 55 of the generator D, the circuit completed being from battery A through contacts 80, 81, 82, brushes 25, contacts 74, 73, field 54, 55, contacts 56, 57, 59, 60, 34, 31, 32, 76, back to the line through contacts 75 and 74, as shown diagrammatically in Fig. 8. If now the foot switch is depressed to close the contacts 56, 58, the current from the battery passes through the generator and its field in the series, the current flowing from the battery A through the contacts 80, 81, 82, brushes 25, contacts 74, 53, field 54, 55, contacts 56, 58, 51 and armature of the generator to ground, as shown in Fig. 9. The driving shaft 10 being held stationary, the field magnet 2 of the generator will be rotated, and as it is connected to the crank shaft 1 of the engine V, said crank shaft will be rotated to start the engine.

After the engine starts, the foot switch is released, and the hand lever 21 is actuated to bring the lower set of brushes 25 to the position F (Fig. 7), the circuit as illustrated in the diagram of Fig. 10 being from the generator through contacts 51, 52, lower brushes 25, contact 53, to the generator field 54, 55, thence through contacts 56, 57, 59, 60, 34, brushes 32, 31, to contacts 33, 63, 64, 65, brushes 25, contacts 66, 67, motor field 68, 69, contacts 70, 71, brushes 25, contacts 72, 83, through the motor armature to ground. The field 2, now rotating with the speed of revolution of the internal combustion engine, will carry the armature 3 with it to an extent corresponding with the cam surface 12 of the recess 13. But, since before the commencement of the driving of the driving shaft 10 the hammer head 11 is stationary and the armature shaft 4 is held fast by the hammer head at a definite point of the curve 12, the field 2 of the generator rotates at a high speed of revolution, as compared with the stationary armature 3, and thus, the generator produces the maximum strength of current. This current is led to the motor M which now begins to work with a small air gap, and consequently, with high induction. When the moment of attraction has become sufficiently large, the driving shaft 10 will be set in motion. Now since the armatures of the motor and generator are keyed to a common shaft 4, the generator armature 3 consequently rotates at a definite speed which, however, is much less than the speed of revolution of the generator field 2, so that during the starting and at any time until the vehicle has reached its greatest speed, continuous current is generated by the dynamo and flows to the motor, as described above, and as shown in Figs. 10 and 11. Meanwhile, the turning moment, most favorable at any time, demanded from the internal combustion engine, having regard to the variable resistances, is automatically obtained owing to the fact that with increased resistance the transmission of power between the two shafts 4 and 10 is not effected at the right hand point, Fig. 1, of the curve 12, but the lagging of the hammer head as the bearings 17 roll along the curve and approach the point 14, produces a movement of the hollow shaft 4 in the direction of the arrow (Fig. 1) and thus brings about an alteration of the air gaps of the two electrical machines. By the diminution of the magnetic resistance of the motor, its speed of revolution and also the current strength raised by the increased loading, is reduced. At the same time, owing to the enlargement of the air gap of the generator, its field is weakened and the turning moment necessary for a definite current is reduced, with the result that the turning moment most favorable to be given by the internal combustion engine, is automatically maintained.

The diagram of Fig. 10 of the drawings illustrates the circuit which corresponds to a position of the hand lever 21 in which the lowermost set of brushes 25 are in the position F of Figs. 6 and 7, and before the hand lever has been rotated about its longitudinal axis to vary the resistances. With the lever in this position, it will be noted that the field 54—55 of the dynamo is shunted by the circuit 74, 75, 76, 34. Rotation of the hand lever about its longitudinal axis will cause the resistances of the dynamo shunt to be switched in and will produce an increase in the current generated by the dynamo, with a consequent delivery of a greater current to the motor and therefore an increase in speed of the vehicle. If a further increase of speed is desired, the rotation of the hand lever 21 about its axis is continued to bring the pair of brushes 31, 32 into engagement with the contacts 78, 77, whereby the dynamo shunt is switched out and the motor field is switched in, as indicated in Fig. 11. The continued rotation of the hand lever will cause all of the resistances in the motor field shunt to be cut out until the maximum speed through the motor-shunt is obtained. When the vehicle has attained its maximum speed through the motor-shunt circuit, a further rotation of the hand lever will bring one pair of the brushes 31—32 into engagement with the contacts 94, 95, while the other pair will be in conducting relationship with the contacts 34, 84. The latter contacts switching out the motor M and producing a direct drive from the engine V to the shaft 10, the armature of the dynamo D operating with the rotating field 2 as an electric clutch, while the placing of the contacts 94, 95 in conducting relationship, causes the solenoid switch 90, 91, 92, 96 to be thrown in, thus completing the circuit through the auxiliary winding 88, 89 of the motor and the battery A. The motor now operating as a generator, and with the help of the auxiliary winding 88, 89 on the field poles, automatically regulated in the known manner, gives out a constant voltage for charging the battery A, which battery is utilized for providing current for the illumination of the vehicle and for the ignition system of the internal combustion engine.

Backward or reverse driving is achieved by moving the hand switch to bring the upper set of brushes 25 (Fig. 7) to the position R, thus reversing the direction of rotation of the electro-motor by changing the polarity, and simultaneously weakening the field of the generator, the circuit as shown in Fig. 12 being from the generator to contacts 51, 52, brushes 25, contact 74, from which point the current branches, part passing through the contact 53 to the field 54, 55, contacts 56, 57 and 59, and the other part being a shunt from the contact 74 to the contact 75, 76, and dynamo shunt, thence through the brushes 31, 32 to the contact 34 and contact 60 to join again at the contact 59, from which point the current passes to the contact 85 through the brushes 25, contacts 71, 70, through the field 69, 68, contact 67, 86, 87, 72, 83, through the motor armature to ground. The regulation of the mechanism for reversing is effected as hereinbefore described by means of the cam surface 12, except that the curvature of said cam is preferably made flatter in the half concerned with backward driving.

When the hand lever 21 is moved to the braking position in which the lower brushes are in the position B, the polarity of the motor field and also that of the generator field is reversed so that the motor M works as a generator and the generator D as a motor in such manner that the energy supplied by the vehicle (downhill running or braking) is electrically transmitted to the internal combustion engine, in which process the light running work of the internal combustion engine and the electrical transmission losses represent the braking resistances of which the latter can be increased or altered by the switching-in of the resistances 76, 77 by a turning of the hand lever 21 about its longitudinal axis. When the hand switch is set to the position B for braking, as indicated in the diagram of Fig. 13, the current flows from the motor M to the contacts 83, 72, 86, 67 through the field 68, 69, to the contacts 70, 71, brushes 25, contacts 53, generator field 54, 55 (generator D now acting as a motor), contact 56, 58 and 51, through the armature of the generator D to the ground.

The constructive union of the above mentioned regulating organs with the driving set is effected in such a manner that hand and foot switches are built on, with appropriately provided fitting surfaces, directly to the actual electrical driving set, fully enclosed and in such a manner that by these means there is attained a very short and enclosed cable connection, in order to prevent the cables and their points of connection from getting dirty or injured and also to avoid unnecessary resistance losses.

This constructive union is of essential importance for the reliable operation of rapid power driven vehicles, in which the parts concerned are exposed to dust and dampness. Finally the function of free running may be attained with the set in the simplest manner.

In known power driven vehicles the fuel consumption is increased unnecessarily by the fact that, particularly in the case of journeys in country with varying gradients, gas must be continuously admitted, the motor driving the vehicle by means of the clutch and the variable gear. On all downhill sections, curves, and sections with limited view, the admission of gas is throttled, the kinetic force of the vehicle again driving the motor through the clutch and the gear, and the motor, in consequence of its light running work, acting as a brake, and thus wasting power and using fuel.

Meanwhile, it is impossible in ordinary vehicles always to adapt the clutch to the manner of movement concerned (motor driving or driven) and accordingly they are driven almost exclusively with the clutch in, so that the motor remains continuously connected with the axle drive. Meanwhile the petrol motor, insofar as it is driven by the vehicle, must always make the large number of revolutions which is given by the speed of travel prevailing and the gear in operation. It has therefore previously been proposed to introduce in the usual power driven vehicles a mechanical free running device between the clutch and the variable gear. According to this invention this advantage is achieved without any switching or brake arrangement, as is more fully described below.

Since the dynamo and the electro-motor work as series wound machines, excitation can only arise in one direction of rotation and consequently transmission of power from the vehicle (from the driving shaft 10) to the internal combustion engine is not possible without alteration of the switching (brake switching).

If, in the case of downhill travel, the motor which has become a generator is not switched over, it gives off no current to the generator D which has become a motor, in consequence of which there is automatically attained the function of free running in the transmission and, by the complete stopping of the internal combustion engine thus caused, a considerable saving of fuel.

I claim:

1. An electric switch for use in combination with a combined generator and motor set for an automotive vehicle, said switch being provided with a hand-operated lever mounted for rotation upon its longitudinal axis and for swinging movement in two planes in a manner similar to the selective, sliding transmission gear shifting lever, to bring the same into a plurality of different set-operating positions, a plurality of contacts arranged within said switch, certain of which contacts are closed when said lever is in its said operating positions, connections from said contacts to the set with which said switch is to be used to cause said set to be actuated for starting, for forward driving, for backward driving and to cause said set to exert a braking action, a plurality of switch contacts closed by rotation of said lever and a plurality of resistances connected with said contacts.

2. An electric switch for use in combination with a combined generator and motor set for an automotive vehicle, said switch being provided with a hand-operated lever mounted for rotation upon its longitudinal axis and for swinging movement in two planes in a manner similar to the selective, sliding transmission gear shifting lever, to bring the same into a plurality of different set-operating positions, a plurality of contacts arranged within said switch, certain of which contacts are closed when said lever is in its said operating positions, connections from said contacts to the set with which said switch is to be used to cause said set to be actuated for starting, for forward driving, for backward driving and to cause said set to exert a braking action, a plurality of switch contacts closed by rotation of said lever, a plurality of resistances connected with said contacts, and means to prevent pivotal movement of said lever except when said resistances are short circuited.

3. An electrical switch comprising a casing containing a plurality of resistances, a switch lever mounted within said casing for pivotal and sliding movement in planes perpendicular to one another, and also for rotation about its axis independently of said pivotal and sliding movements, and a sleeve journalled in said casing and loosely connected with said lever, said sleeve serving as a carrier for diametrically mounted insulated brushes for said resistances and also serving as a latching device for preventing the pivotal movement of said lever when any of said resistances are in circuit.

4. An electric hand switch especially adapted for connection with a combined generator and motor set for an automotive vehicle comprising a hand operated switch having a lever mounted for pivotal movement into a plurality of operative positions, said lever in addition to its pivotal movements being rotatable about its longitudinal axis, a pair of resistances, and connections from said resistances to a plurality of contacts within said switch whereby said resistances will be varied by the rotation of said lever about its longitudinal axis.

5. An electric switch comprising a casing, a hand operated lever similar to the lever employed for the usual selective gear sliding transmission of an automobile, means for connecting said lever to said casing for pivotal movement in two planes, a plurality of contacts arranged in the casing, means operated by the hand lever to slide on said contacts, means which permit rotational movement of said hand lever about its longitudinal axis, and a plurality of contacts closed by the turning of said hand lever.

6. An electric switch comprising a casing, a hand operating lever similar to the lever employed for the usual selective gear sliding transmission of an automobile, means for connecting said lever to said casing for pivotal movement in two planes extending at right angles to each other, said means also permitting rotational movement of said lever about its longitudinal axis, a pair of brush holders, a plurality of contacts over which said brush holders are slidable, each of said holders being provided with means with which said lever is adapted to be selectively engaged by pivotal movement thereof in one of said planes and said holders being movable along said contacts by the pivotal movement of said lever in the other of said planes.

7. An electric switch comprising a casing, a hand operating lever similar to the lever employed for the usual selective gear sliding transmission of an automobile, means for connecting said lever to said casing for pivotal movement in two planes extending at right angles to each other, said means also permitting rotational movement of said lever about its longitudinal axis, a pair of brush holders, a plurality of contacts over which said brush holders are slidable, each of said holders being provided with means with which said lever is adapted to be selectively engaged by pivotal movement thereof in one of said planes and said holders being movable along said contacts by the pivotal movement of said lever in the other of said planes, a plurality of contacts arranged about said casing substantially concentrically of the axis of said lever, and a pair of brushes connected with said lever for rotation upon said last named contacts when said lever is rotated upon its axis.

8. An electrical switch comprising a casing, a hand lever pivotally mounted in said casing for movement in planes perpendicular to one another, two sets of sliding contacts mounted within said casing which are engaged upon movement of said lever in one of said planes and are actuated by said lever upon movement thereof in the other of said planes, said lever also being mounted for rotation about its longitudinal axis independently of its pivotal movement, a plurality of resistances mounted within said casing, and contacts within said casing connected with said resistances, said contacts being constructed and arranged to be closed by rotation of said lever about its longitudinal axis.

9. An electrical switch comprising a casing, a hand lever pivotally mounted in said casing for movement in planes perpendicular to one another, two sets of sliding contacts mounted within said casing which are engaged upon movement of said lever in one of said planes and are actuated by said lever upon movement thereof in the other of said planes, said lever also being mounted for rotation about its longitudinal axis independently of its pivotal movement, a plurality of resistances mounted within said casing, contacts within said casing connected with said resistance, said contacts being constructed and arranged to be closed by the rotation of said lever about its longitudinal axis, and means to prevent the pivotal movement of said lever except when said resistances are short-circuited.

10. An electric switch comprising a casing, a plurality of contacts within the casing, a pair of guide bolts within the casing, independently movable brush holders provided with brushes slidable on said bolts for movement into engagement with the aforesaid contacts, a handle in said casing mounted for rotation about its longitudinal axis and for pivotal movement in two planes perpendicular to each other, each of said brush holders being provided with an opening with which said handle may engage in order to move said brush holders along said guide bolts, the said openings being so arranged that movement of the handle in a plane perpendicular to the bolts moves the handle out of engagement with one brush holder and into engagement with the other, a plurality of resistances in said casing, a sleeve rotatably mounted within said casing and connected with the handle to rotate upon rotation of the latter about its longitudinal axis, said sleeve serving as a carrier for a plurality of brushes by which said resistances are placed in circuit, and said sleeve and said brush holders being provided with interchanging parts which prevent shifting of said lever and brush holders from one position to another when any of said resistances are in circuit.

FERDINAND PORSCHE.